United States Patent [19]

Mercier

[11] 4,114,905
[45] Sep. 19, 1978

[54] SEAL RING COMPRISING A HOLLOW DEFORMABLE METAL ELEMENT

[75] Inventor: Bernard Mercier, Houilles, France

[73] Assignee: Le Joint Francais, Paris, France

[21] Appl. No.: 585,531

[22] Filed: Jun. 10, 1975

[30] Foreign Application Priority Data

Jun. 26, 1974 [FR] France .................. 74 22250
Jul. 23, 1974 [FR] France .................. 74 25463
Feb. 4, 1975 [FR] France .................. 75 03399

[51] Int. Cl.² .............................................. F16J 15/00
[52] U.S. Cl. .................................. 277/164; 277/153; 277/211
[58] Field of Search ............... 277/211, 164, 163, 139, 277/140, 205, 153

[56] References Cited

U.S. PATENT DOCUMENTS

| | | | |
|---|---|---|---|
| 2,988,409 | 6/1961 | Fuhrmann | 277/163 |
| 3,223,426 | 12/1965 | Reid | 277/211 |
| 3,464,707 | 9/1969 | Packard et al. | 277/163 |
| 3,467,397 | 9/1969 | Sugahara | 277/163 |
| 3,680,874 | 8/1972 | Schwarz | 277/153 |
| 3,820,799 | 6/1974 | Abbes et al. | 277/164 |
| 3,847,389 | 11/1974 | Rogers | 277/205 |

*Primary Examiner*—Richard E. Aegerter
*Assistant Examiner*—L. Footland
*Attorney, Agent, or Firm*—Sughrue, Rothwell, Mion, Zinn and Macpeak

[57] ABSTRACT

The invention concerns a metal seal ring comprising a jacket made of ductile metal intended to be clamped between two surfaces to be applied against each other in a fluid-tight manner and one or two internal spiral springs having close-wound turns made of metal wire, the jacket being provided with a bead in the vicinity of its bearing lines on the surfaces to be applied against each other, the spiral springs are formed with a wire having a cross-section such that it avoids the creeping of the metal of the jacket between the turns in the vicinity of the bearing lines on the surfaces to be applied against each other. Such a seal withstands numerous assembling and dismantling cycles and rises and lowerings of the temperature, without any appreciable loss of its fluid-tight qualities.

4 Claims, 13 Drawing Figures 4,114,905

SEAL RING COMPRISING A HOLLOW DEFORMABLE METAL ELEMENT

BACKGROUND OF THE INVENTION

1. Field of the Invention

The present invention concerns a seal ring comprising a deformable hollow metal element intended to be clamped between two surfaces to be applied against each other in a fluid-tight manner and a spiral spring inside the hollow deformable metal element and flexibly withstanding the deformations of the latter.

2. Description of the Prior Art

It would be thought that a seal of that type would retain its fluid-tight qualities during a very long period, due to the fact that the hollow deformable metal element would be applied with a sufficient pressure by the spiral spring on the surfaces to be applied against each other in a fluid-tight manner and to compensate the micro-defects in flatness of surfaces to maintien fluid-titht sealing. Now, it has been discovered that such seals lose their fluid-tight qualities progressively, due a creeping of the metal of the hollow deformable element between the turns of the springs, causing an application of that element on the irregularities of the surfaces to be brought together which is not so good (a phenomenon observed more particularly when there are thermal shocks).

The aim of the present invention is to overcome the above disadvantage and to produce a seal ring for surfaces to be applied against each other, such as flanges, which maintain excellent sealing after numerous successive dismantling and assembling operations, putting under pressure or under vacuum, temperature rises or lowerings.

SUMMARY OF THE INVENTION

The seal ring according to the invention is characterized in that it comprises means for avoiding creeping of the deformable metal of the hollow element from the zones of contact with the two surfaces to be applied against each other.

According to a first embodiment, the internal web of the hollow deformable metal element is constituted by a spiral spring whose turns are close wound, having a rectangular cross-section, whose small short side is parallel to the axis of the spring and substantially equal to half the long side.

According to a second embodiment, the internal web comprises at least two spiral springs, interwoven with each other and having contiguous turns, with an outside diameter of the winding slightly less than the inside diameter of the hollow deformable metal element, the developed length of the set of spiral springs being a little greater than that of the covering, so that at the time of the shaping, the turns of at least one of the springs move away radially from those of the other outwards and that after clamping between the surfaces to be applied against each other, the pressure zone of the hollow deformable metallic element on the turns of the springs bears on the flats formed from a practically continuous line in the upper and lower polar zones of the turns of each of the springs under the effect on the clamping.

According to other embodiment, the internal web is constitueted by a spiral spring whose turns are close wound, made of wire having a substantially triangular cross-section comprising a side parallel to the axis of the spring and bearing against the internal part of the cover or having an elliptical cross-section whose long or short axis is parallel to the axis of the spring, or lastly having a circular cross-section with a flat on the external side.

According to another embodiment, the hollow deformable metal element comprises a bead in the vicinity of its bearing circumferences on the surfaces to be applied against each other, having a profile tangent to a plane parallel to the said surfaces, or comprising a flat part in that same plane.

The possibilities of creeping of the metal of the hollow deformable element between turns of helical springs having, on the one hand, a circular cross-section and on the other hand, a rectangular cross-section, as well as several variants of embodiment of the invention, are described hereinbelow by way of examples and with reference to the accompanying drawings.

12, but in which the bead has a trapezoidal cross-section.

DESCRIPTION OF PREFERRED EMBODIMENTS

Figure 1:
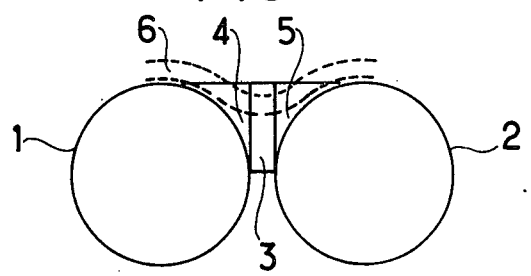
FIG. 1 is a schematic representation showing the volume provided for the creeping of the metal of the hollow deformable element between two turns of a wire of a toroidal spring having a circular cross-section.

In FIG. 1, the space provided for the creeping of the ductile metal, for example aluminium, between the turns 1 and 2 made of metal which is harder (steel, for example), comprises the rectangular central zone 3, limited by the tangents to the turns perpendicular to the axis of the torus and the common external tangent, and the lateral zones 4 and 5. It can be considered that after a certain operation time, the ductile metal of the hollow element could substantially assume the profile shown by the curve in discontinuous lines 6. The creeping would therefore be great, all the more so as the circular profile of the turns makes this easier and the hollow deformable element would be in danger of no longer sufficiently mating the irregularities in the surface of the flanges between which the seal would be applied to ensure complete sealing.

Figure 2:
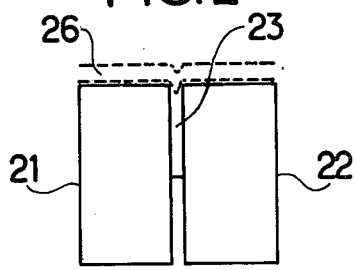
FIG. 2 is a schematic view which shows the volume provided for the creeping of the metal of the hollow deformable element between two turns of a wire having a rectangular cross-section whose long side is perpendicular to the axis of the torus, having a length which is twice that of the short side.

In FIG. 2, the space provided for the creeping of the external cover made of ductile metal between the turns of hard metal wire having a rectangular cross-section, 21 and 22, is reduced to the rectangular zone 23. After a certain operation time, the external ductile metal would assume substancially the profile shown by the curve shown by a discontinuous line 26.

Figure 3:
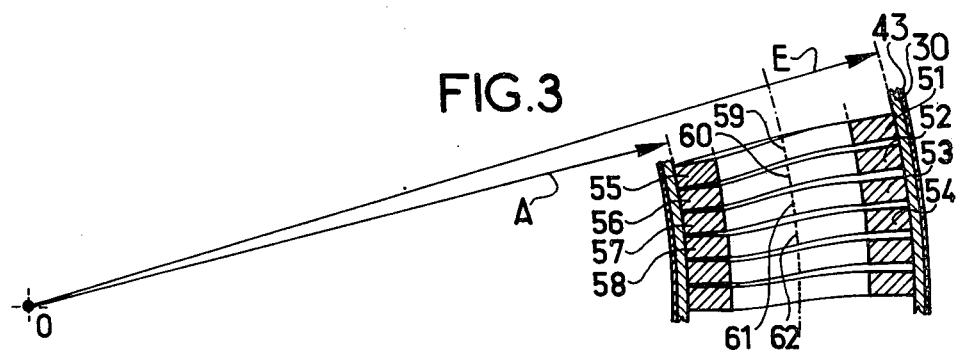
FIG. 3 is a cross-sectional view, through an equatorial plane of a sector of a seal ring with a helical spring whose turns are made of wire having a rectangular cross-section, showing the gap between the turns, on the one hand, on the internal side and on the other hand, on the external side and having a deformable hollow cover provided with a chemical protective coating.

The seal a segment of which is shown in FIG. 3 comprises a rectangular spring whose long side perpendicular to the axis of the torus is twice the short side (turns shown in cross-sections 51, 52, 53, 54 in the external part, 55, 56, 57, 58 in the internal part, 59, 60, 61, 62 showing the projections on the plane of the figure of the lines of contact of the turns with the cover made of ductile metal at the places where it undergoes the pressure of the flanges). The ductile metal sleeve 30 is provided with an external protective chemical coating 43 made of a relatively ductile material, formed by any suitable method: chemical depositing electrolytic depositing, spraying etc., having a thickness which can reach 150 microns. If, for example, the sleeve is made of aluminium or copper, the protective coating can be silver gold, platinum or a plastic material such as polytetrafluoroethylene.

Figure 4:
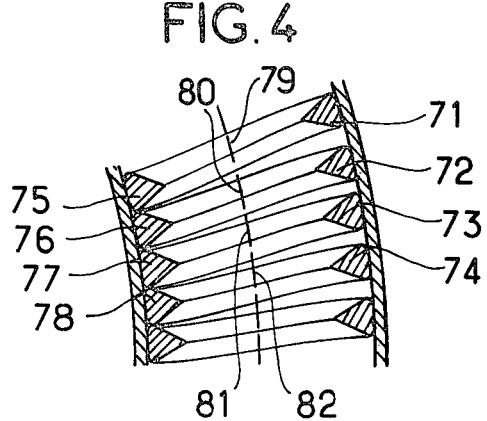
FIGS. 4 to 6 are views in cross-section, similar to those in FIG. 3, but in which the helical turns of the spring are, respectively, made of a wire having a triangular, elliptical and circular cross-section with a flat on the external side and the deformable hollow cover does not comprise any protective chemical coating.

The seal a segment of which is shown in FIG. 4 is similar to that in FIG. 3, but it comprises a spring having a substantially triangular cross-section one of whose sides in parallel to the axis of the spring and is applied to the internal surface of a jacket, the ridges of the spring nevertheless being rounded (turns shown in cross-sections 71, 72, 73, 74 in the external part, 75, 76, 77, 78 in the internal part, 79, 80, 81, 82 showing the projections on the plane of the figure of the lines of contact of the turns with the jacket made of ductile metal at the places where it undergoes the pressure of the flanges).

Figure 5:
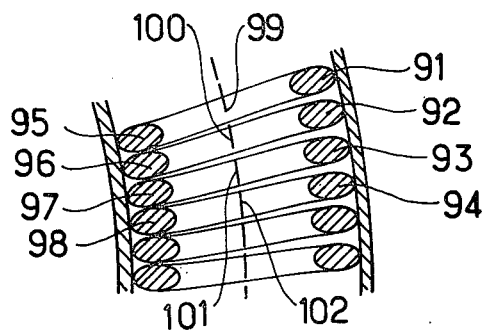

The seal a segment of which is shown in FIG. 5 is similar to those in FIGS. 3 and 4, but it is formed by means of a spring having an elliptical cross-section with short parallel to the axix of the spring (turns shown in cross-section 91, 92, 93, 94 in the external part 95, 96, 97, 98 in the internal part, 99, 100, 101, 102 showing the projections on the plane of the figure of the lines of contacts of the turns with the jacket along its circumferences of contact with the flanges). It would also be possible to use a spring having an elliptical cross-section with its long side parallel to the axis of the spring.

Figure 6:
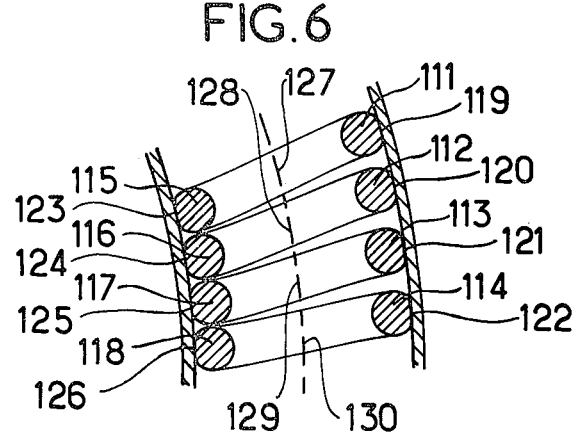

The seal a segment of which is shown in FIG. 6 is similar to those in FIGS. 3 to 5, but it is formed by means of a spring having a circular cross-section, cut by a flat on the external side (turns shown in cross-sections 111, 112 113, 114, with flats 119, 120, 121, 122 in the external part and in cross-sections 115, 116, 117, 118 in the internal part, with flats 123, 124, 125, 126 whereas 127, 128, 129, 130 represent the projections on the plane of the figure of the lines of contact of the turns with the jacket along its circumferences of contact with the flanges).

Figure 7:
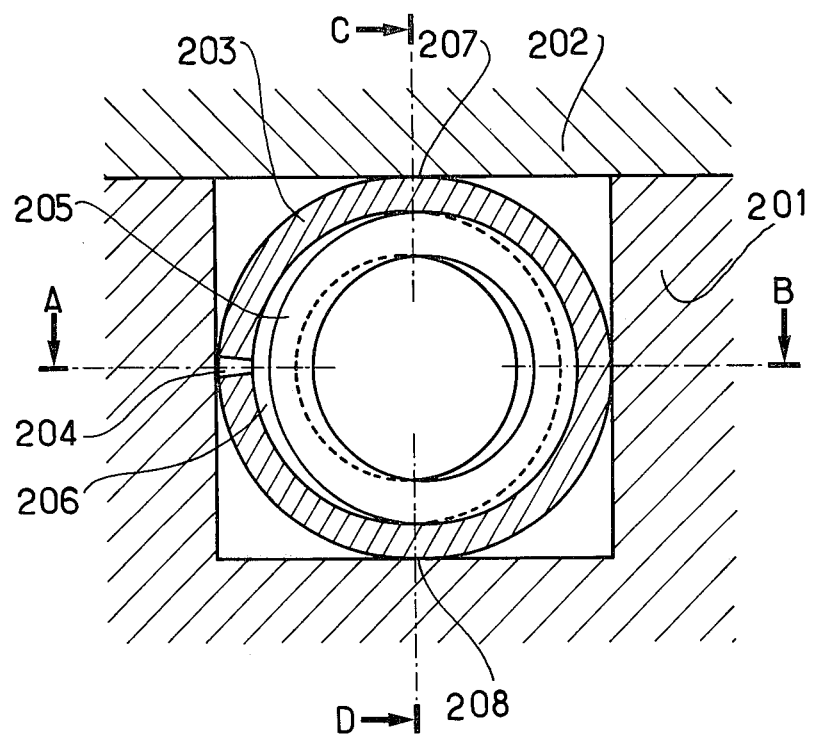
FIG. 7 is a cross-sectional view, through a plane passing through the axis of revolution of the torus, of an O ring with an internal web constituted by two springs having inverted trapezoidal cross-sections, interlaced with each other, in the clamping position.
Figure 8:
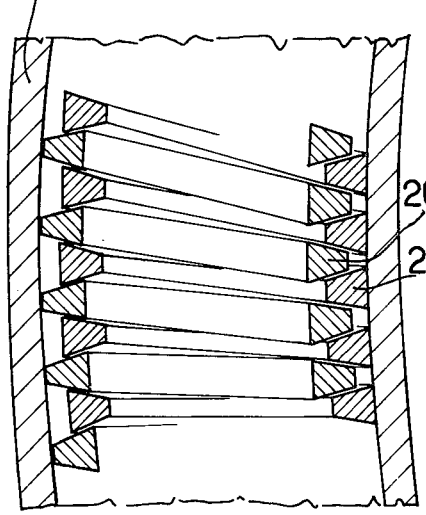
FIG. 8 is a sectional view which shows a segment of a cross-section of the seal in FIG. 7 through the equatorial plane of the torus (axis AB in FIG. 7).
Figure 9:
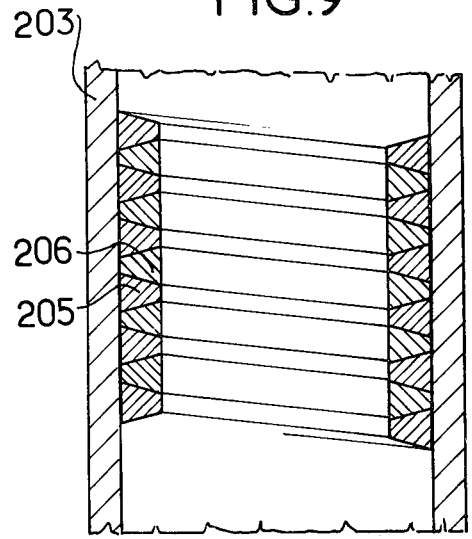
FIG. 9 is a cross-sectional view of the seal in FIGS. 7 and 8 through a plane perpendicular to the equatorial plane and tangent to the circle which is situated at the centres of the turns of the springs (axis CD in FIG. 7).

The O ring shown in FIGS. 7 to 9 is arranged in a groove of a first flange 201 and clamped by a second flange 202. It comprises a jacket 203 made of ductile metal, such as aluminium, copper or lead, or another deformable material a C-shapped cross-section, (its opening 204 subsisting after the clamping being, in the case shown, on the external side of the torus).

Under the effect of the compression on the internal side of the torus produced by the toroidal forming, the turns such a 205 and 206 of the helical springs, made of flexible and harder metal, such as steel, are shifted in the equatorial plane, the turns 206 having a small base on the external side being pushed back towards the outside of the torus until they come into contact with the internal surface of the ductile cover. The pressure exerted by the flanges at the time of the clamping has the effect of crushing the turns and of pushing back into the polar zones where the jacket transmits to them the pressure, the turns having a short base on the external side to the same height as the other turns, in contact with the jacket forming flats 207 and 208. Due to this fact, the assembly formed by the two springs has, in these polar zones and in the vicinity thereof, a continuous external surface, even or substantially even with respect to the ductile jacket this practically eliminating any possibility of creeping of the metal of the jacket between the turns of the springs in the zone where the jacket is compressed against the springs. Thus, for an O ring having an average diameter of 102 mm, comprising springs with turns having a diameter of 7 mm inserted in a ductile jacket having a thickness of 0.75 mm, the maximum shifting of the turns of one of the springs in relation to those of the other, in the equatorial plane, is 0.2 mm on either side, that is, in all, 0.4 mm. The turns then assume an elongated shape, having a long axis of 8.9 mm and a short axis of 8.5 mm and there appears in their polar zones a flat having a width of 0.4 mm where the external surfaces of the turns are in the same horizontal plane.

Figure 10:
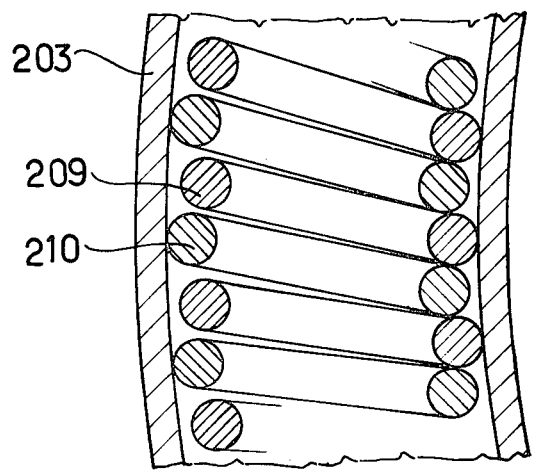
FIG. 10 is a view which shows a sector of a cross-section through the equatorial plane of the torus of an O ring having internal web constituted by two springs having a circular cross-section.
Figure 11:
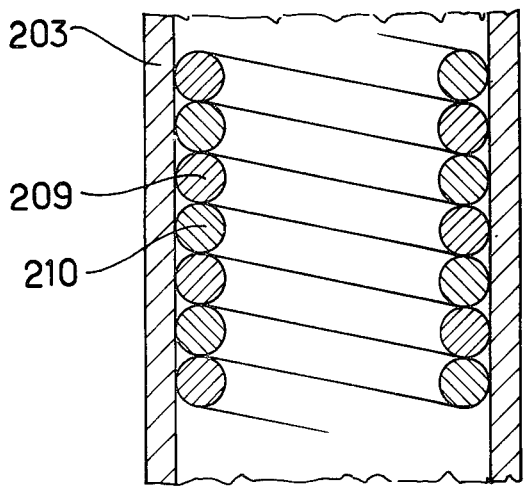
FIG. 11 is a view which shows a cross-section of the seal in FIG. 10 through a plane perpendicular to the equatorial plane and tangent to the circle which is situated at the centres of the turns of the springs.

The sealing O ring shown in FIGS. 10 and 11 has turns with a circular cross-section. At the time of the torioial forming, the turns 210 of one of the springs are shifted outwards. After the clamping between the flanges, the shifting of the turns subsists in the midle plane, but the clamping pressure crushes the turns and pushes the shifted turns 210 back outwards in the polar zones to the level of the others (209).

The possibilities of creeping of the ductile jacket, without being completely eliminated, due to the circular shape of the turns, are nevettheless appreciably reduced, due to the fact the turns are in contact with each other, instead of allowing a certain gap between them, as would be the case if there were only on spring inside the cover.

Naturally it is possible to use helical springs having a different cross-section, more particularly an elliptical cross-section having a long axis pointing along a radius of the torus; ovoid (the ends having a slight radius of curvature being alternate, outwards for one of the springs, inwards for another), etc. It is also possible to constitute seals comprising, inside the jacket, two helical springs side by side, separated or otherwise by a stop, or arranged in two different jackets connected by a plane element.

Such seals are manufactured more particularly as set forth hereinbelow:

The helical springs are manufactured from one or several metal wires having good flexibility, with a cross-section chosen as a function of that of the surfaces, generally of the flanges, which will accomodate the seal, of the linear pressure required on the seal and the flange, of the maximum bending flexibility provided for, of the degree of sealing to be obtained, of the fluid contained in the enclosure or the piping, of its pressure, of its temperature, as well as of the material and the dimensions of the external jacket made of ductile metal. In certain cases, another spring could be placed inside the first ones, with the same direction of winding or in a reverse direction, more particularly to ensure a greater resistance to crushing.

The deformable jacket will be made of a metal choses as a function of the ambient medium of the temperature of the pressure inside the enclosure and of the nature of the metal of the flanges or similar surfaces. It could be doubled by a simple or multiple coating with one or several other metals, more particularly by plating, for example with a view to ensuring the chemical protection thereof with respect to the fluid contained in the enclosure.

The shaping of the ring and the positioning of the spring could be effected by different methods, such as swaging, profiling enclosing etc., in order to impart to the seal its final profile and cross-section, taking into account a defined play which must be left between the inside diameter of the cover and the outside diameter of the springs.

The cross-section of the jacket will preferably be C-shaped, with an opening defined as a function of the maximum bending flexibility provided for. The opening could be formed either towards the outside of the torus or towards the inside thereof, or in an oblique direction, according to requirements. The jacket could also be closed after the clamping of the seal, more particularly if it is required to protect the springs against a corrosive fluid.

The seal can be arranged in a groove, in which the reactions of the lateral walls thereof or of one of these latter, contribute to the resistance to crushing, or between two washers, or coaxially with a single washer, internal or external, these washers then also preferably fulfilling the function of clamping limiters.

The seal preferably has a toroidal shape, but it can, if the design thereof is adapted, be used for obtaining sealing along non-circular lines, either having a variable radius of curvature, for example elliptical seals or comprising rectilinear portions connected by curved portions.

Figure 12:
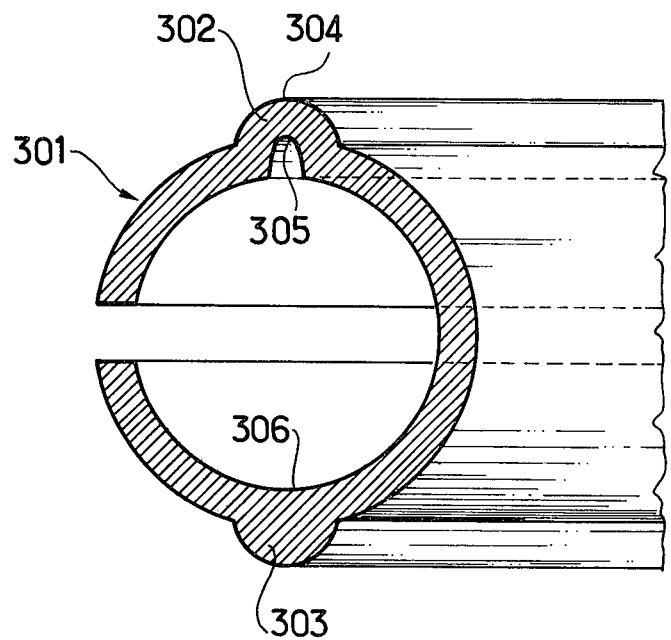
FIG. 12 is a perspective view and cross-section of a hollow deformable element for an O ring provided with a bead having a circular cross-section in the vicinity of its bearing circumferences on the surfaces to be applied against each other.

FIG. 12 shows a cross-section of a hollow deformable metal element for an 0 ring the upper part showing a first variant and the lower part showing a second variant of the profile of the bead.

The jacket 301 made of ductile metal has, in the vicinity of the circumferences along which it would normally come into contact with the flanges to be assembled, beads 302, 303 having a circular profile 304. In its internal part opposite to the bead, the element can comprise either a groove 305 or a full part 306 whose profile is identical to that which the element would have of there had been no bead.

The internal web, (not shown) can be constituted by a helical spring having contiguous turns of wire having a cross-section which is either circular or square, rectangular, triangular, elliptical or circular with a flat on the external side, or by two helical springs interwoven with each other, having contiguous turns of wire having a cross-section which is trapezoidal or circular.

The junction of the ends the contiguous turns can be effected either by conical fitting or, preferably, by spacing the end turns of a pitch apart and grinding and screwing of the ends one in the other. The joint can also be reinforced by adding on the inside of the helical spring(s) an auxiliary portion of spring having turns whose outside diameter is equal to the inside diameter of the turns of the helical spring(s).

Figure 13:
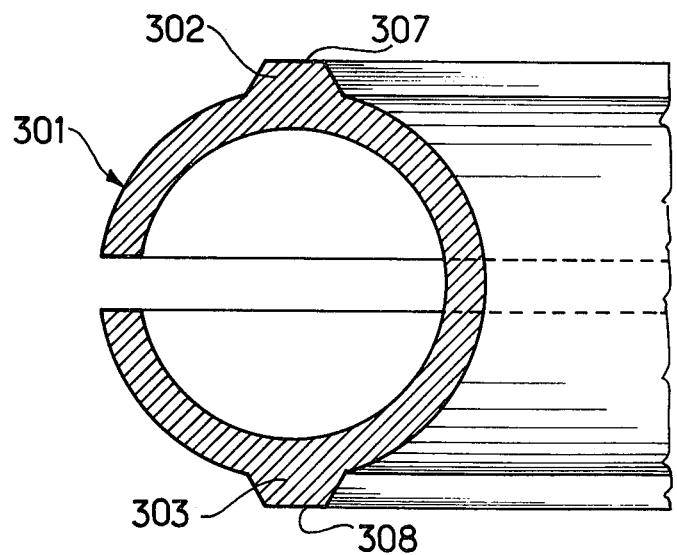
FIG. 13 is a perspective view and cross-section of a hollow deformable metal element similar to that in FIG.

FIG. 13 shows a cross-section of a hollow deformable metal element similar to that in FIG. 12, but having a bead with a trapezoidal shape comprising short bases 307 and 308, parallel to the flanges to be assembled.

Although the embodiments of seal rings which have just been described appear preferable it will be understood that various modifications can be made thereto without going beyond the socpe of the invention, it being possible to replace certain elements by others which would fulfill the same technical function.

I claim:

1. In a seal ring comprising a hollow deformable metal element intended to be clamped between two surfaces to be applied against each other in a fluid-tight manner and an internal web in the form of at least one spiral spring inside the hollow deformable metal element and flexibly resisting the deformations of the other, the improvement wherein said internal web comprises at least two springs, interwoven with each other and having contiguous turns, with an outside diameter of the winding slightly less than the inside diameter of the hollow deformable metal element, the developed length of the set of spiral springs being a little greater than that of the hollow metal element, so that at the time of shaping, the turns of at least one of the springs move away radially from those of the other, and outwardly thereof, and that after clamping between the surfaces to be applied against each other, the pressure zone of the hollow deformable metal element on the turns of the springs bear on flats formed from a practically continuous line in the upper and lower polar zones of the turns of each of the springs under the effect of clamping to avoid creeping of the deformable metal of the hollow element between the turns of the interwoven spiral springs in the zones of contact of the deformable metal element and the surfaces to be sealed.

2. The seal according to claim 1, wherein said internal web comprises two spiral springs whose turns having equal trapezoidal cross-sections, one of the cross-section having its long base on the external side of the turns and the other having its long base on the internal side.

3. The seal according to claim 1, wherein said internal web comprises two spiral springs whose turns are of equal circular cross-section.

4. The seal according to claim 1, wherein the ends of each spring are connected together at the time of the shaping, after grinding and truing perpendicularly to the axis of each end turn, by spacing a few turns apart at each end, then screwing the ends into each other until the elimination of any free gap in the junction zone.

* * * * *